(12) United States Patent
Matsushima et al.

(10) Patent No.: US 12,442,974 B2
(45) Date of Patent: Oct. 14, 2025

(54) VEHICULAR LAMINATED GLASS HAVING A LIGHT SOURCE AND AN OPTICAL ELEMENT FOR INTRODUCING LIGHT INTO THE GLASS

(71) Applicant: AGC Inc., Tokyo (JP)

(72) Inventors: Takanori Matsushima, Tokyo (JP); Kenichiro Shimo, Tokyo (JP); Yusuke Ikeda, Tokyo (JP); Masanobu Ogawa, Tokyo (JP); Hidenori Takai, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/796,039

(22) Filed: Aug. 6, 2024

(65) Prior Publication Data

US 2024/0393525 A1    Nov. 28, 2024

Related U.S. Application Data

(63) Continuation of application No. PCT/JP2023/003383, filed on Feb. 2, 2023.

(30) Foreign Application Priority Data

Feb. 9, 2022    (JP) ................ 2022-018729

(51) Int. Cl.
  *F21V 8/00*    (2006.01)
  *B32B 17/10*    (2006.01)

(52) U.S. Cl.
  CPC ...... *G02B 6/0095* (2013.01); *B32B 17/10036* (2013.01); *B32B 17/1044* (2013.01);
(Continued)

(58) Field of Classification Search
  CPC .. G02B 6/0018; G02B 6/0023; G02B 6/0013; G02B 6/002; G02B 6/0028; G02B 6/003; B32B 17/10036; B32B 17/10541
  See application file for complete search history.

(56) References Cited

U.S. PATENT DOCUMENTS 5,341,230 A * 8/1994 Smith ................ G02B 27/0081
                                                 359/13
5,452,385 A * 9/1995 Izumi ................ G02F 1/133615
                                                 349/196

(Continued)

FOREIGN PATENT DOCUMENTS

JP    H07-126046 A    5/1995
JP    3259872 B2    2/2002
(Continued)

OTHER PUBLICATIONS

International Searching Authority, "International Search Report," issued in connection with International Patent Application No. PCT/JP2023/003383, dated Apr. 25, 2023.
(Continued)

*Primary Examiner* — Ismael Negron
(74) *Attorney, Agent, or Firm* — Foley & Lardner LLP (57) ABSTRACT

A vehicular laminated glass includes a first glass plate having a first main surface and a second main surface, a second glass plate having a third main surface and a fourth main surface, an adhesive interlayer disposed between the second main surface and the third main surface, a light source which faces the fourth main surface and emits light toward the fourth main surface, and an optical element which is disposed between the fourth main surface and the light source and refracts light emitted from the light source into the fourth main surface.

18 Claims, 8 Drawing Sheets

(52) U.S. Cl.
CPC .. *B32B 17/10541* (2013.01); *B32B 17/10761* (2013.01); *G02B 6/0031* (2013.01); *B32B 2605/00* (2013.01)

(56) References Cited

U.S. PATENT DOCUMENTS

| | | | | |
|---|---|---|---|---|
| 6,048,071 | A * | 4/2000 | Sawayama | G02B 6/0018 349/63 |
| 8,317,352 | B2 * | 11/2012 | Saccomanno | G02B 6/0095 362/125 |
| 10,545,346 | B2 * | 1/2020 | Waldern | G06F 3/0433 |
| 10,661,641 | B2 * | 5/2020 | Thannheimer | G02B 6/0046 |
| 12,233,778 | B2 * | 2/2025 | de Bie | B60Q 3/208 |
| 2023/0118480 | A1 * | 4/2023 | Pasquarelli | B32B 17/10541 296/215 |
| 2024/0308309 | A1 * | 9/2024 | Nellen | B60Q 3/62 |
| 2024/0393525 | A1 * | 11/2024 | Matsushima | F21V 5/00 |
| 2024/0424984 | A1 * | 12/2024 | Pasquarelli | B60Q 3/208 |

FOREIGN PATENT DOCUMENTS

| | | |
|---|---|---|
| JP | 2013-517989 A | 5/2013 |
| JP | 5802684 B2 | 10/2015 |
| JP | 2018-518796 A | 7/2018 |
| JP | 2020-001454 A | 1/2020 |
| WO | WO-2020/201489 A1 | 10/2020 |
| WO | WO-2021/198262 A1 | 10/2021 |
| WO | WO-2022/096365 A1 | 5/2022 |

OTHER PUBLICATIONS

International Searching Authority, "Written Opinion," issued in connection with International Patent Application No. PCT/JP2023/003383, dated Apr. 25, 2023.

* cited by examiner

Fig. 2

Fig. 3
[Evaluation results 1]

Fig. 4
[Evaluation results 1]

| $\theta_1=20°$ | | | | | $\theta_p[°]$ | | | | |
|---|---|---|---|---|---|---|---|---|---|
| $n_2$ | 10 | 20 | 30 | 40 | 50 | 60 | 70 | 80 |
| 1.2 | ○ | ○ | ○ | ◎ | ◎ | ◎ | ◎ | × |
| 1.3 | ○ | ○ | ○ | ◎ | ◎ | ◎ | ◎ | × × |
| 1.4 | ○ | ○ | ○ | ◎ | ◎ | ◎ | ◎ | × × |
| 1.5 | ○ | ○ | ◎ | ◎ | ◎ | ◎ | ◎ | × × |
| 1.6 | ○ | ○ | ◎ | ◎ | ◎ | × | × | × × |
| 1.7 | ○ | ○ | ◎ | ◎ | × | × | × | × × |
| 1.8 | ○ | ○ | ◎ | ◎ | × | × | × | × |
| 1.9 | ○ | ○ | ◎ | ◎ | × | × | × | × |
| 2.0 | ○ | ○ | ◎ | × | × | × | × | × |

| $\theta_1=30°$ | | | | | $\theta_p[°]$ | | | | |
|---|---|---|---|---|---|---|---|---|---|
| $n_2$ | 10 | 20 | 30 | 40 | 50 | 60 | 70 | 80 |
| 1.2 | ○ | ○ | ◎ | ◎ | ◎ | ◎ | ○ | × × |
| 1.3 | ○ | ○ | ◎ | ◎ | ◎ | ◎ | × × | × × |
| 1.4 | ○ | ○ | ◎ | ◎ | ◎ | ◎ | × × | × × |
| 1.5 | ○ | ○ | ◎ | ◎ | ◎ | ◎ | ◎ | × |
| 1.6 | ○ | ○ | ◎ | ◎ | ◎ | × | × | × × |
| 1.7 | ○ | ○ | ◎ | ◎ | × | × | × | × × |
| 1.8 | ○ | ○ | ◎ | × | × | × | × | × |
| 1.9 | ○ | ○ | ◎ | × | × | × | × | × |
| 2.0 | ○ | ○ | ◎ | × | × | × | × | × |

| $\theta_1=45°$ | | | | | $\theta_p[°]$ | | | | |
|---|---|---|---|---|---|---|---|---|---|
| $n_2$ | 10 | 20 | 30 | 40 | 50 | 60 | 70 | 80 |
| 1.2 | ○ | ○ | ◎ | ◎ | ◎ | × × | × × | × × |
| 1.3 | ○ | ○ | ◎ | ◎ | ◎ | × × | × × | × × |
| 1.4 | ○ | ○ | ◎ | ◎ | ◎ | ◎ | × × | × × |
| 1.5 | ○ | ○ | ◎ | ◎ | ◎ | × | × × | × × |
| 1.6 | ○ | ○ | ◎ | ◎ | × | × | × × | × × |
| 1.7 | ○ | ○ | ◎ | × | × | × | × × | × × |
| 1.8 | ○ | ○ | ◎ | × | × | × | × × | × × |
| 1.9 | ○ | ○ | × | × | × | × | × × | × × |
| 2.0 | ○ | ○ | × | × | × | × | × × | × × |

| $\theta_1=60°$ | | | | | $\theta_p[°]$ | | | | |
|---|---|---|---|---|---|---|---|---|---|
| $n_2$ | 10 | 20 | 30 | 40 | 50 | 60 | 70 | 80 |
| 1.2 | ○ | ○ | ◎ | ◎ | × × | × × | × × | × × |
| 1.3 | ○ | ○ | ◎ | ◎ | × × | × × | × × | × × |
| 1.4 | ○ | ○ | ◎ | ◎ | ◎ | × × | × × | × × |
| 1.5 | ○ | ○ | ◎ | ◎ | ◎ | × × | ◎ | × × |
| 1.6 | ○ | ○ | ◎ | ◎ | × | × | × | × × |
| 1.7 | ○ | ○ | × | × | × | × | × | × × |
| 1.8 | ○ | ○ | × | × | × | × | × | × × |
| 1.9 | ○ | ○ | × | × | × | × | × | × × |
| 2.0 | ○ | ○ | × | × | × | × | × | × × |

Fig. 5

[Evaluation results 2]

| $\theta_1=0°$ | $\theta_2 \, [°]$ | | | | | | | |
|---|---|---|---|---|---|---|---|---|
| $n_2$ | 10 | 20 | 30 | 40 | 50 | 60 | 70 | 80 |
| 1.2 | 1 | 2 | 3 | 5 | 6 | 6 | 7 | 7 |
| 1.3 | 1 | 2 | 4 | 5 | 6 | 7 | 7 | 8 |
| 1.4 | 1 | 3 | 4 | 5 | 7 | 8 | 8 | 9 |
| 1.5 | 1 | 3 | 4 | 6 | 7 | 8 | 9 | - |
| 1.6 | 1 | 3 | 5 | 6 | 8 | 9 | - | - |
| 1.7 | 1 | 3 | 5 | 7 | 8 | 11 | - | - |
| 1.8 | 2 | 4 | 5 | 7 | 9 | - | - | - |
| 1.9 | 2 | 4 | 6 | 8 | 10 | - | - | - |
| 2.0 | 2 | 4 | 6 | 8 | - | - | - | - |

Fig. 8

VEHICULAR LAMINATED GLASS HAVING A LIGHT SOURCE AND AN OPTICAL ELEMENT FOR INTRODUCING LIGHT INTO THE GLASS This application is a continuation of PCT Application No. PCT/JP2023/003383, filed on Feb. 2, 2023, which is based upon and claims the benefit of priority from Japanese Patent Application No. 2022-018729 filed on Feb. 9, 2022. The contents of those applications are incorporated herein by reference in their entireties.

TECHNICAL FIELD

The present invention relates to a vehicular laminated glass.

BACKGROUND ART

A laminated glass having two glass plates bonded by means of a resin sheet (an adhesive interlayer) has been used for a window of a vehicle and a building. In recent years, a light emitting window is being developed, such that using a light source such as a light emitting diode (LED), an irradiation light is introduced from an edge of the laminated glass into the laminated glass and the light is taken out using a scattering layer provided in the laminated glass.

Patent Document 1 discloses a technique relating to a vehicle glazing having a LED disposed e.g. on an edge surface of a glass plate on the vehicle interior side and guiding light in the laminated glass to emit light.

PRIOR ART DOCUMENTS

Patent Documents

Patent Document 1: JP-A-2013-517989

DISCLOSURE OF INVENTION

Technical Problem

However, depending upon the structure of a vehicle, a structure is hardly employed such that a light is introduced from a side surface of a glass plate, as in Patent Document 1. For example, in a case where a width between a body frame and a glass plate side surface of a vehicle on which the glazing is to be mounted is narrow, a space for disposing a light source cannot be secured on the side surface of the glass plate. Further, in a case where the light source is mounted on a glass surface side, it is difficult to adjust the angle of incidence of light to the glass surface and to efficiently guide the light inside the glass.

Under these circumstances, the object of the present invention is to provide a vehicular laminated glass which can properly introduce a light into the laminated glass.

Solution to Problem

According to an aspect of the present invention, provided is a vehicular laminated glass comprising a first glass plate having a first main surface and a second main surface,
a second glass plate having a third main surface and a fourth main surface,
an adhesive interlayer disposed between the second main surface and the third main surface,
a light source which faces the fourth main surface and applies light toward the fourth main surface, and
an optical element which is disposed between the fourth main surface and the light source and refracts irradiation light from the light source.

In the above vehicular laminated glass, the optical element may be attached to the fourth main surface.

In the above vehicular laminated glass, the optical element may have an adhesive surface, and the adhesive surface and the fourth main surface may be in contact with each other directly or via an optical adhesive layer.

In the above vehicular laminated glass, the optical element may have a light-receiving surface which faces the light source, and the angle of incidence $\theta_1$ of the irradiation light to the light-receiving surface may be 0° or more and 45° or less.

In the above vehicular laminated glass, the light source may be attached to the light-receiving surface of the optical element.

In the above vehicular laminated glass, the angle of incidence $\theta_4$ of the irradiation light which has entered the second glass plate by way of the optical element to the third main surface may be 20° or more and less than 90°.

In the above vehicular laminated glass, the refractive index of the optical element may be equal to or less than the refractive index of the second glass plate, and a value obtained by subtracting the refractive index of the optical element from the refractive index of the second glass plate may be 0.32 or less.

In the above vehicular laminated glass, the refractive index of the optical element may be higher than the refractive index of the second glass plate.

In the above vehicular laminated glass, the optical element may contain glass or a resin material.

In the above vehicular laminated glass, the optical element may have a reflective layer.

The above vehicular laminated glass may have a covering which can be attached to the fourth main surface, and the covering may cover the light source and the optical element.

The above vehicular laminated glass may have a scattering layer at least one of on the first main surface, on the fourth main surface, and between the first main surface and the fourth main surface.

Advantageous Effects of Invention

According to the present invention, a vehicular laminated glass which can properly introduce light into the laminated glass can be provided.

DESCRIPTION OF EMBODIMENTS

Now, the embodiment of the present invention will be described with reference to the drawings.

Figure 1:
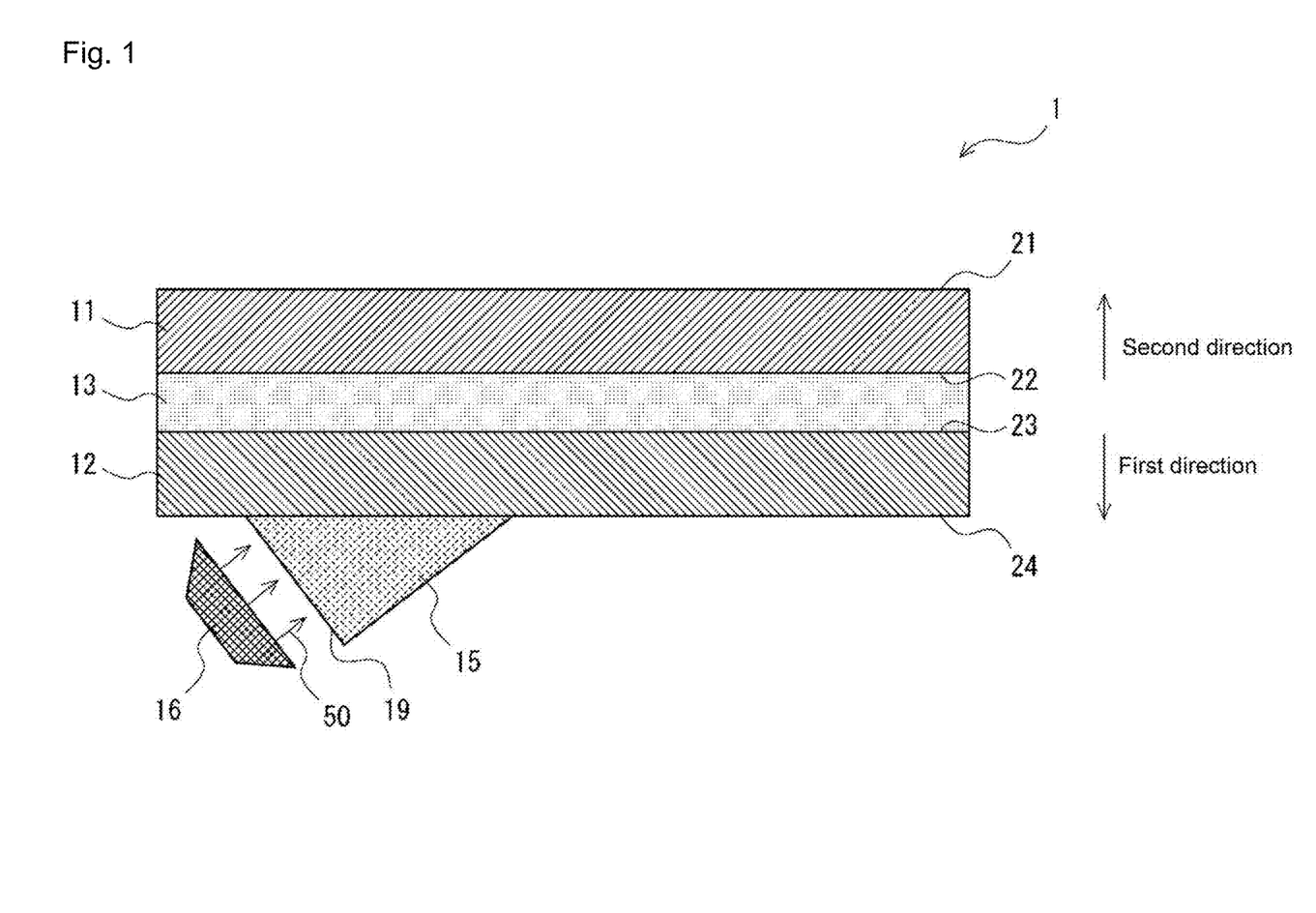
FIG. 1 is a cross-sectional view illustrating an example of the configuration of a vehicular laminated glass according to an embodiment.

FIG. 1 is a cross-sectional view illustrating an example of the configuration of a vehicular laminated glass according to an embodiment. As shown in FIG. 1, the vehicular laminated glass 1 according to the present embodiment comprises a first glass plate 11, a second glass plate 12, an adhesive interlayer 13, an optical element 15 and a light source 16. The vehicular laminated glass 1 according to the present embodiment may be used, for example, as a vehicle window. The vehicle window includes, for example, a roof glass, a windshield and a side window. Hereinafter, a "vehicular laminated glass" will sometimes be referred to simply as a "laminated glass".

The first glass plate 11 has a first main surface 21 and a second main surface 22. The second glass plate 12 has a third main surface 23 and a fourth main surface 24. Between the second main surface 22 of the first glass plate 11 and the third main surface 23 of the second glass plate 12, the adhesive interlayer 13 is disposed. That is, the adhesive interlayer 13 bonds the first glass plate 11 and the second glass plate 12.

The material used for the adhesive interlayer 13 is not particularly limited, and any material for an interlayer to be used for a laminated glass may be used. The thickness of the adhesive interlayer 13 also is not particularly limited. The adhesive interlayer 13 may be constituted by a plurality of layers. For example, the adhesive interlayer 13 may include a sound insulating interlayer. The cross section of the adhesive interlayer 13 may have a shape other than a rectangular shape (for example, wedge shape).

The laminated glass 1 according to the present embodiment may be planar or may be curved, or may have a shape including both a planar shape and a curved shape. That is, each of the first glass plate 11 and the second glass plate 12 may be a flat plate or a curved plate. In the following example, explanations will be made with reference to a case where the first glass plate 11 and the second glass plate 12 are both flat plates.

In the laminated glass 1 according to the present embodiment, the direction from the first glass plate 11 toward the second glass plate 12 is taken as a first direction, and the direction from the second glass plate 12 toward the first glass plate 11 is taken as a second direction. When the laminated glass 1 is mounted on a vehicle, the first glass plate 11 may be positioned on the vehicle exterior side, and the second glass plate 12 may be positioned on the vehicle interior side. In such a case, the first direction is the vehicle interior direction, and the second direction is the vehicle exterior direction.

The optical element 15 is disposed between the fourth main surface 24 of the second glass plate 12 and the light source 16, and refracts an irradiation light 50 from the light source 16. That is, the optical element 15 has a light-receiving surface 19 facing the light source 16, and the light source 16 introduces the irradiation light 50 to the light-receiving surface 19 of the optical element 15. The optical element 15 refracts the irradiation light 50 when the irradiation light 50 enters into the light-receiving surface 19 of the optical element 15 at a predetermined angle of incidence $\theta_1$ ($\theta_1 \neq 0°$, see FIG. 2), and in the present embodiment, a case where the irradiation light 50 enters into the light-receiving surface 19 of the optical element 15 at an angle of incidence $\theta_1 = 0°$ is included. That is, in a case where the angle of incidence $\theta_1 = 0°$, strictly speaking, the optical element 15 does not refract the irradiation light 50, but the present invention includes a case where the angle of incidence $\theta_1 = 0°$. The irradiation light 50 is light with maximum light intensity as a representative among light emitted from the light source 16. In a case where the irradiation light 50 enters at a plurality of angles of incidence $\theta_1$, for example in a case where the light source 16 approximates to a point light source, the irradiation light 50 is representatively light along a line connecting the center of a region at which the illuminance is maximum in the light-receiving surface 19, and the light source 16.

The optical element 15 is attached to the fourth main surface 24 of the second glass plate 12. For example, the optical element 15 has an adhesive surface and is attached to the fourth main surface 24 so that the adhesive surface and the fourth main surface 24 are in contact with each other directly or via the optical adhesive layer. For example, the optical element 15 is constituted by glass or a resin material. For example, the resin material may be an acrylic resin, an epoxy resin or a silicone rubber. As the optical element 15, it is preferred to use a transparent material, but the optical element may be colored to such an extent that the effects of the present invention are not impaired.

In the example shown in FIG. 1, the cross-sectional shape of the optical element 15 (the cross section in the irradiation light 50 travelling plane) is triangular. The longest side of the triangle is included in the adhesive surface, and the side closer to the periphery of the laminated glass 1 of the other two sides is included in the light-receiving surface 19. The thickness of the optical element 15 increases from the peripheral portion of the laminated glass 1 toward the center portion, and decreases from a predetermined position. The predetermined position is the position of an apex not included in the adhesive surface of the triangle. By the optical element 15 having such a cross-sectional shape (distributed thickness), expansion or bent by heat or moisture absorption can be prevented. As a result, the range of light propagation can easily be precisely controlled, and the durability will improve. The cross-sectional shape of the optical element 15 is not limited to triangular, and may be polygonal such as quadrangular, or may include a curved surface. In such a case, the above "predetermined position" may be any position from one edge to the other edge of the adhesive surface (excluding the edges). That is, the optical element 15 preferably has a portion where the thickness increases and a portion where the thickness decreases, from one end toward the other end of a side constituting the adhesive surface in a cross-sectional view.

The angle $\theta_p$ formed by the fourth main surface 24 of the second glass plate 12 and the light-receiving surface 19 of the optical element 15 is preferably less than 90°, for example within a range of 10° to 80°. The larger the angle $\theta_p$, the smaller the contact area (contact width) of the optical element 15 and the second glass plate 12 can be made, and the smaller the angle $\theta_p$, the thinner the optical element 15 can be made. The angle $\theta_p$ may be 80° or less, may be 70° or less, may be 60° or less, may be 50° or less, may be 40° or less, may be 30° or less, or may be 20° or less. The angle $\theta_p$ may be 10° or more, may be 20° or more, may be 30° or more, may be 40° or more, may be 50° or more, may be 60° or more, or may be 70° or more. A preferred range of the angle $\theta_p$ will be described later, with a view to controlling the state of light to be introduced into the laminated glass 1.

For the optical element 15, it is preferred to use a material having a coefficient of thermal expansion closer to the coefficient of thermal expansion of the second glass plate 12, in other words, a material with a small difference in the coefficient of thermal expansion. Further, a reflective layer (reflective coating) may be provided on a surface other than the light-receiving surface 19 to which light is introduced, of the optical element 15. In a case where such a reflective layer is provided, leakage of light from a surface other than the light-receiving surface 19 of the optical element 15 can be prevented.

The light source 16 is disposed to face the fourth main surface 24 of the second glass plate 12 and applies the irradiation light 50 toward the fourth main surface 24. That is, the light source 16 faces the fourth main surface 24 of the second glass plate 12 via the optical element 15, and the irradiation light 50 applied from the light source 16 is introduced to the fourth main surface 24 of the second glass plate 12 by way of the optical element 15. The irradiation light 50 may arrive at the fourth main surface 24 from the light-receiving surface 19 straight, or by means of reflection in the optical element 15. For the light source 16, a light emitting diode (LED), an organic EL element or the like may be used. The light source 16 may be disposed apart from the light-receiving surface 19 of the optical element 15. The light source 16 may be attached to the light-receiving surface 19 of the optical element 15.

In the example of the configuration shown in FIG. 1, the laminated glass 1 has one optical element 15 and one light source 16, but may have a plurality of optical elements 15 and a plurality of light sources 16, and their numbers may be different. For example, the number of light sources 16 may be larger than the number of optical elements 15. For example, by providing a plurality of optical elements 15 and a plurality of light sources 16 along the peripheral portion of the laminated glass 1, the entire peripheral portion of the laminated glass 1 is likely to emit light. Further, the optical element 15 and the light source 16 may be provided on one pair or two pairs pf facing sides of the laminated glass 1.

Figure 2:
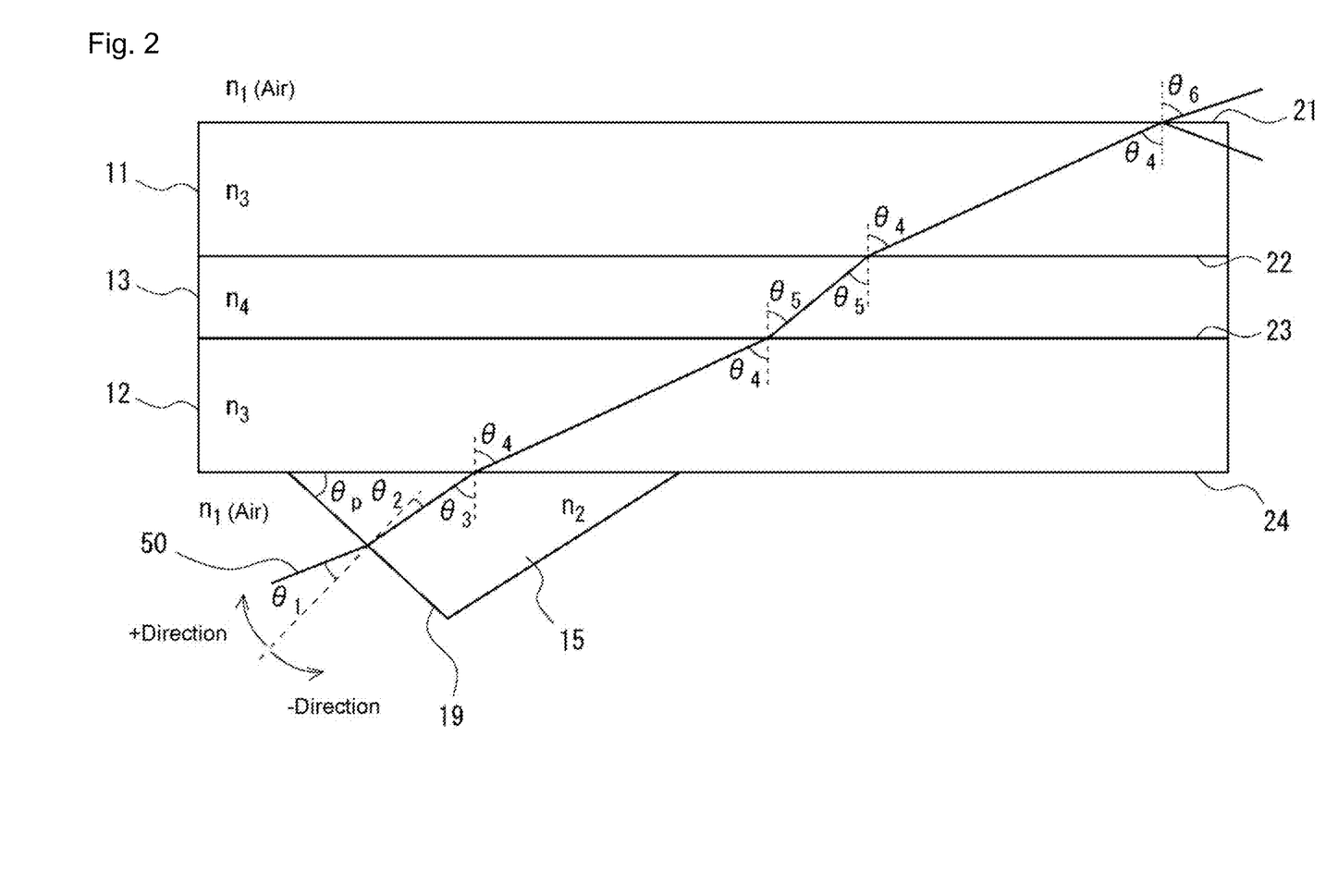
FIG. 2 is a cross-sectional view illustrating optical properties of a vehicular laminated glass according to an embodiment.

Now, optical properties of the laminated glass 1 according to the present embodiment will be described. FIG. 2 is a cross-sectional view illustrating optical properties of the laminated glass according to the present embodiment. In the example of the configuration shown in FIG. 2, as in the example of the configuration shown in FIG. 1, the first glass plate 11 and the second glass plate 12 are bonded via the adhesive interlayer 13. Further, to the fourth main surface 24 of the second glass plate 12, the optical element 15 is provided.

In the example of the configuration shown in FIG. 2, the refractive index of the air is $n_1$, the refractive index of the optical element 15 is $n_2$, the refractive index of the first glass plate 11 and the second glass plate 12 is $n_3$, and the refractive index of the adhesive interlayer 13 is $n_4$. The refractive index of the first glass plate 11 and the refractive index of the second glass plate 12 may be different from each other.

Upon entrance of the irradiation light 50 (hereinafter sometimes referred to as light 50) from the light source 16 (see FIG. 1) into the light-receiving surface 19 of the optical element 15, the incident light 50 propagates inside the optical element 15. At this time, the refractive index of the air is $n_1$ and the refractive index of the optical element 15 is $n_2$, and when the light 50 enters the optical element 15 at an angle of incidence $\theta_1$, by Snell's law, the incident light is refracted and the refracted light at an angle of refraction $\theta_2$ propagates inside the optical element 15. Further, the refractive index of the optical element 15 is $n_2$ and the refractive index of the second glass plate 12 is $n_3$, and when the light which has propagated inside the optical element 15 enters into the fourth main surface 24 of the second glass plate 12 at an angle of incidence $\theta_3$ ($0°<\theta_3<90°$), the incident light is refracted and the refracted light at an angle of refraction 64 propagates inside the second glass plate 12.

The refractive index of the second glass plate 12 is $n_3$ and the refractive index of the adhesive interlayer 13 is $n_4$, and when the light which has propagated inside the second glass plate 12 enters the adhesive interlayer 13 at an angle of incidence $\theta_4$, the incident light is refracted and the refracted light at an angle of refraction $\theta_5$ propagates inside the adhesive interlayer 13. The refractive index of the adhesive interlayer 13 is $n_4$ and the refractive index of the first glass plate 11 is $n_3$, and when the light which has propagated inside the adhesive interlayer 13 enters into the second main surface 22 of the first glass plate 11 at an angle of incidence $\theta_5$, the incident light is refracted and the refracted light at an angle of refraction 84 propagates inside the first glass plate 11.

Then, the light which has propagated inside the first glass plate 11 is totally reflected on the first main surface 21 of the first glass plate 11, or radiates into the air. In a case where the light radiates into the air, the refractive index of the first glass plate 11 is $n_3$ and the refractive index of the air is $n_1$, and the angle of refraction of the light radiating into the air is $\theta_6$. Whether the light which has propagated inside the first glass plate 11 is totally reflected on the first main surface 21 of the first glass plate 11 or radiates into the air is determined depending upon the refractive index $n_3$ of the first glass plate 11 and the angle of incidence $\theta_4$ to the first main surface 21 of the first glass plate 11. In a case where the light which has propagated inside the first glass plate 11 radiates into the air, part of the light which has propagated inside the first glass plate 11 is reflected on the first main surface 21 of the first glass plate 11 to become reflected light. According to the present embodiment, the object is to properly introduce a light to the laminated glass 1, and thus it is preferred that the light which has propagated inside the first glass plate 11 is totally reflected on the first main surface 21 of the first glass plate 11.

According to the present embodiment of the invention, the optical element 15 is disposed between the fourth main surface 24 of the second glass plate 12 and the light source 16 to refract the irradiation light 50 from the light source 16. That is, the optical element 15 is disposed and the irradiation light 50 from the light source 16 is introduced to the fourth main surface 24 of the second glass plate 12 at an appropriate angle of incidence $\theta_3$. Thus, light can properly be introduced to the laminated glass.

Now, conditions of the respective angles of incidence will be described in detail.

In the present embodiment, the angle of incidence $\theta_1$ of the irradiation light 50 to the light-receiving surface 19 is preferably 0° or more and 45° or less. The angle of incidence in + direction shown in FIG. 2 is the angle of incidence of a positive value. If the angle of incidence $\theta_1$ is too large, regardless of the refractive index $n_2$ of the optical element 15, the light may not enter the second glass plate 12 from the optical element 15 and resultingly the light will not enter inside the second glass plate 12. In such a case, the light 50 introduced to the optical element 15 from the light-receiving surface 19 leaks outside the second glass plate 12.

Particularly in a case where the angle $\theta_p$ formed by the fourth main surface 24 of the second glass plate 12 and the light-receiving surface 19 of the optical element 15 is large (for example 70° to 80°), if the angle of incidence $\theta_1$ is large, the light hardly enters the second glass plate 12 from the optical element 15. In a case where the angle $\theta_p$ is small (for example 20° to 30°), if the angle of incidence $\theta_1$ is large, the light may be totally reflected at the interface between the optical element 15 and the fourth main surface 24 of the second glass plate 12 and the light will not enter inside the second glass plate 12. In such a case, the light 50 introduced to the optical element 15 from the light-receiving surface 19 leaks outside the second glass plate 12.

Particularly in the present embodiment, the angle of incidence $\theta_1$ is preferably 20° or less, more preferably 15° or less, further preferably 10° or less, furthermore preferably 5° or less, most preferably 0° (may be substantially 0°). In a case where the angle of incidence $\theta_1$ is 20° or less, the problem such that the light 50 hardly enters the second glass plate 12 from the optical element 15 can effectively be suppressed.

Particularly in a case where the angle $\theta_p$ is large (for example 70° to 80°), such a problem can effectively be suppressed. When the angle of incidence $\theta_1$ is 15° or less, the problem such that the light 50 hardly enters the second glass plate 12 from the optical element 15 can be suppressed and further, the interface reflectance at the interface between the air and the optical element 15 can be made sufficiently low. For example, the interface reflectance of the light 50 entering the optical element 15 (that is the interface reflectance at the light-receiving surface 19) can be made 1% or less.

In a case where the angle of incidence $\theta_1$ is 10° or less, even when the angle $\theta_p$ is large (for example about 80°), total reflection is less likely to occur at the interface between the optical element 15 and the second glass plate 12, and the adjustable range of the angle $\theta_p$ increases. In a case where the angle of incidence $\theta_1$ is 5° or less, even when the angle $\theta_p$ is small, total reflection is less likely to occur at the interface between the optical element 15 and the second glass plate 12, and the adjustable range of the angle $\theta_p$ increases. In a case where the angle of incidence $\theta_1$ is 0°, substantially no reflection occurs when the light 50 enters the optical element 15 from the air. In such a manner, according to the present embodiment, by adjusting the angle of incidence $\theta_1$ of the irradiation light 50 to the light-receiving surface 19 within a range of 0° or more and 45° or less, the angle of incidence $\theta_3$ to the second glass plate 12 from the optical element 15 can effectively be adjusted.

Further, in the present embodiment, the angle of incidence $\theta_4$ of the light which has entered the second glass plate 12 by way of the optical element 15 to the third main surface 23, is preferably 20° or more and less than 90°. When this condition is satisfied, the light is likely to reach far (that is the center side in the in-plane direction). In the present embodiment, the angle of incidence $\theta_4$ is preferably 30° or more, 40° or more, 50° or more, 60° or more, 70° or more. Particularly the angle of incidence $\theta_4$ is important as an angle to determine the condition that the light is totally reflected at the interface between the first glass plate 11 and the air (the angle $\theta_6$). In order that the light is totally reflected at the interface between the first glass plate 11 and the air, it is preferred that the angle of incidence $\theta_4$ is 40° or more. This applies to cases where the angle of incidence $\theta_1$ is other than 0°.

The angle of incidence $\theta_4$ is preferably less than 80°, more preferably 76° or less. If the angle of incidence $\theta_4$ exceeds 80°, total reflection of the light is likely to occur at the interface between the second glass plate 12 and the adhesive interlayer 13, and in a case where a scattering layer is positioned on the vehicle exterior side (the second direction side) than the third main surface 23, proper scattering may not be obtained.

In the present embodiment, the angle of incidence $\theta_4$ may be 80° or more and less than 90°. In such a case, by providing the scattering layer on the vehicle interior side (the first direction side) than the third main surface 23, proper scattering may be obtained. For example, the scattering layer may be provided on the third main surface 23 or the fourth main surface 24. Further, since the light can propagate inside the second glass plate 12, light absorption by the adhesive interlayer 13 or the first glass plate 11 can be suppressed. Accordingly, such is effective when at least one of the adhesive interlayer 13 and the first glass plate 11 has a visible light transmittance lower than the second glass plate 12. For example, as the first glass plate 11, colored glass such as privacy glass, heat absorbing glass, etc., may be used. As the adhesive interlayer 13, e.g. a colored interlayer may be used. Also in a case where the angle of incidence $\theta_4$ is less than 80°, colored glass or the like may be used as the first glass plate 11 and a colored interlayer or the like may be used as the adhesive interlayer 13.

In the present embodiment, the refractive index of the optical element 15 may be equal to or less than the refractive index of the second glass plate 12. For example, the value obtained by subtracting the refractive index of the optical element 15 from the refractive index of the second glass plate 12 may be 0.32 or less. In a case where the angle of incidence $\theta_3$ is 60°, if the refractive index $n_2$ of the optical element 15 is lower than 1.2, approximately 10% of the incident light is reflected at the interface between the optical element 15 and the fourth main surface 24 of the second glass plate 12. Thus, the refractive index $n_2$ of the optical element 15 is preferably 1.2 or more. For example, in a case where the refractive index $n_3$ of the second glass plate 12 is 1.52, if the refractive index $n_2$ of the optical element 15 is 1.2 or more, the value obtained by subtracting the refractive index $n_2$ of the optical element 15 from the refractive index $n_3$ of the second glass plate 12 is 1.52-1.2=0.32 or less. In the present embodiment, as a reference of the refractive index, for example light at a wavelength of 589.3 nm (sodium D line) is used.

Further, in the present embodiment, the refractive index of the optical element 15 may be higher than the refractive index of the second glass plate 12. In a case where the refractive index of the optical element 15 is higher than the refractive index of the second glass plate 12 in such a manner, the angle of incidence $\theta_4$ to the third main surface 23 can be made large. For example in a case where the angle of incidence $\theta_1$ is 0°, the light propagates the farthest under conditions where $\theta_p=60°$ and $n_2=1.7$. It is preferred that the refractive index $n_2$, the refractive index $n_3$ and the angle $\theta_p$ satisfy the relation $\sin\theta_p<(n_3/n_2)$, whereby total reflection at the interface between the second glass plate 12 and the adhesive interlayer 13 is likely to be prevented.

As described above, in the present embodiment, the optical element 15 is disposed between the fourth main surface 24 of the second glass plate 12 and the light source 16 to refract the irradiation light 50 from the light source 16. By adjusting the angle of incidence $\theta_1$ of the irradiation light 50 to the optical element 15, the angle $\theta_p$ formed by the fourth main surface 24 of the second glass plate 12 and the light-receiving surface 19 of the optical element 15, the refractive index $n_2$ of the optical element 15 and the like, the state of the light introduced to the laminated glass 1 can be controlled. Specifically, by adjusting such parameters to predetermined values, the light introduced to the laminated glass 1 can be made to propagate far or close, and the range of propagation of the light introduced to the laminated glass 1 can be controlled.

Now, simulation results of the laminated glass according to the present embodiment will be described. In the present embodiment, the simulation conditions were as follows.

A laminated glass having a 2 mm thick soda-lime glass plate (the first glass plate 11)/a 0.76 mm thick PVB sheet (the adhesive interlayer 13)/a 2 mm thick soda-lime glass flat plate (the second glass plate 12) laminated in this order and pressure-bonded, having a scattering layer between the two glass plates, was prepared. A simulation such that the optical element 15 was attached to the second glass plate 12 and light 50 was made to enter the laminated glass by way of the optical element 15 from the light source 16 was conducted. The refractive index $n_1$ of the air was 1.00, the refractive index $n_3$ of the glass flat plate was 1.52, and the refractive index $n_4$ of the PVB sheet was 1.48. In the present embodiment, the following two evaluations were conducted.

(Evaluation 1)

In evaluation 1, the light guidance state was confirmed while the refractive index $n_2$ of the optical element 15, the angle $\theta_p$ formed by the fourth main surface 24 of the second glass plate 12 and the light-receiving surface 19 of the optical element 15, and the angle of incidence $\theta_1$ of the light 50 to the optical element 15 from the light source 16, were respectively changed.

The evaluation standards in evaluation 1 were as follows.

A case where the light does not enter into the interface between the optical element 15 and the second glass plate 12, whereby the light does not enter the second glass plate 12: x x (poor)

A case where the light is totally reflected at the interface between the optical element 15 and the second glass plate 12, whereby the light does not enter the second glass plate 12: x (poor)

A case where the light is not totally reflected on the first main surface 21 of the first glass plate 11 and the light leaks outside from the first glass plate 11: ○ (fair)

A case where the light is totally reflected on the first main surface 21 of the first glass plate 11 and the light does not leak outside from the first glass plate 11: ⊚ (good)

In the above simulation, a case where the calculated value of the angle of incidence $\theta_3$ is 90° or more is graded "x x". A case where the calculated value of the angle $\theta_4$ is 90° or more, even when the calculated value of the angle of incidence $\theta_3$ is less than 90°, is graded "x". A case where the calculated value of the angle $\theta_6$ is less than 90°, even when the calculated value of the angle of incidence $\theta_3$ is less than 90° and the calculated value of the angle $\theta_4$ is less than 90°, is graded "○". Only a case where the calculated value of the angle of incidence $\theta_3$ is less than 90°, the calculated value of the angle $\theta_4$ is less than 90° and the calculated value of the angle $\theta_6$ is 90° or more, is graded "⊚".

Figure 3:
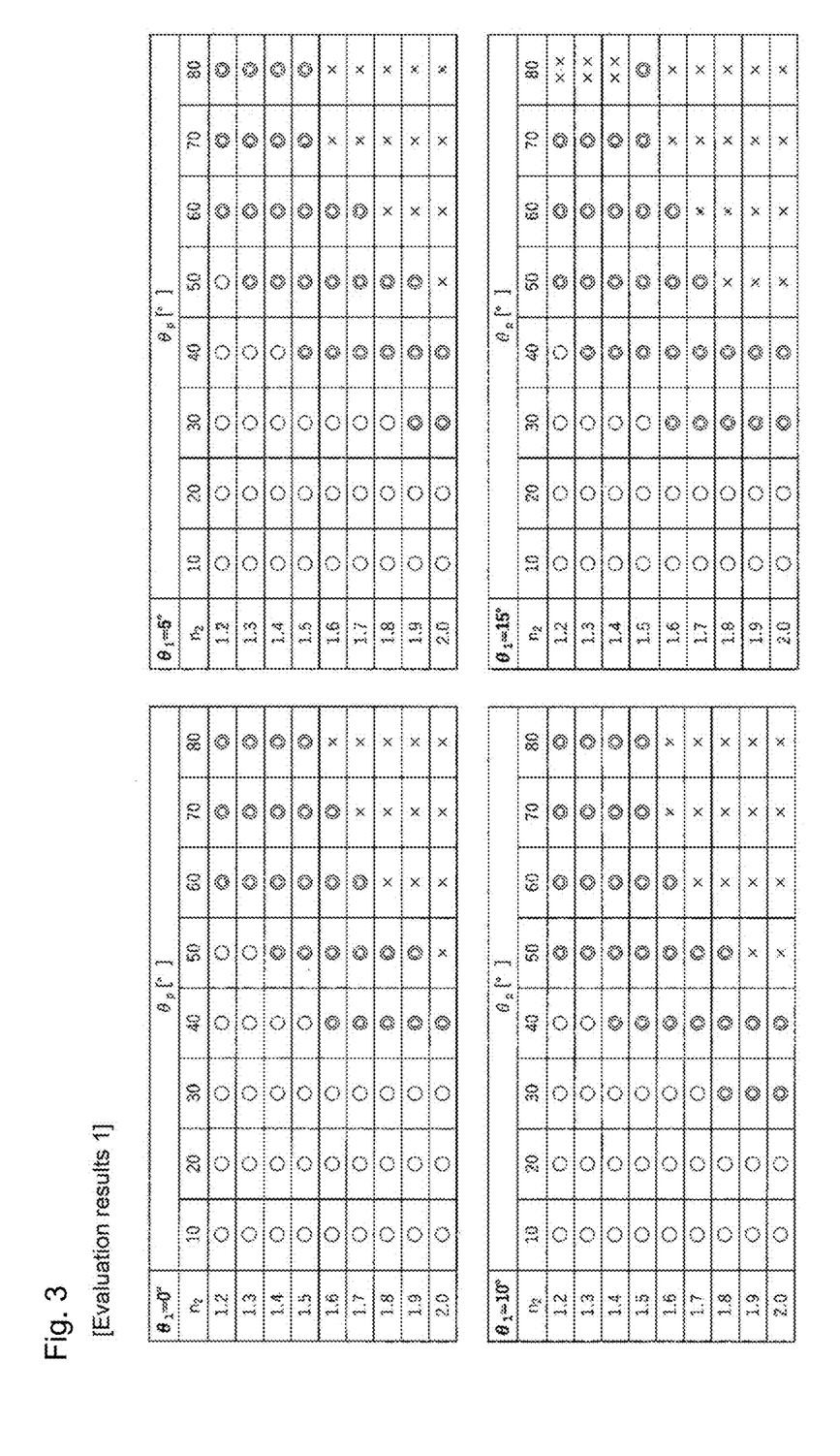
FIG. 3 is a table illustrating simulation results of a vehicular laminated glass according to an embodiment.
Figure 4:
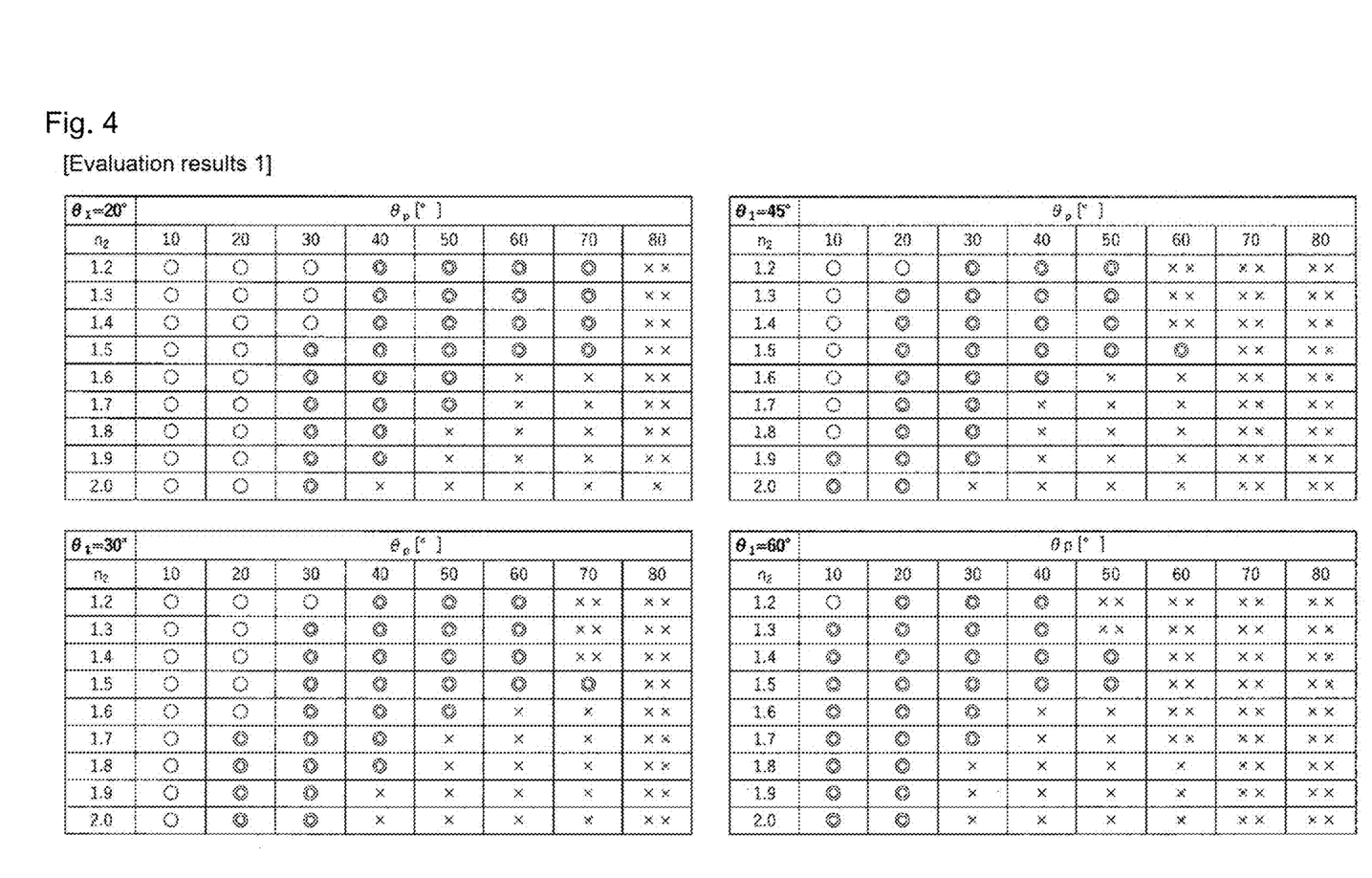
FIG. 4 is a table illustrating simulation results of a vehicular laminated glass according to an embodiment.

In FIGS. 3 and 4 are shown the simulation results of the evaluation 1. From the results shown in FIGS. 3 and 4, it is considered that when the value of the angle of incidence $\theta_1$ is relatively small (for example $\theta_1$=0° to 15°), light is easily introduced into the second glass plate 12. In a case where the value of the angle of incidence $\theta_1$ is relatively small, the angle $\theta_p$ is easily set to a large value (for example 50° or more), and the contact area (contact width) between the optical element 15 and the second glass plate 12 can be made small. On the other hand, in a case where the value of the angle of incidence $\theta_1$ is relatively large (for example $\theta_1$=20° to 60°), by properly setting the refractive index $n_2$ of the optical element 15 and the angle $\theta_p$, light can be introduced into the second glass plate 12. In a case where the value of the angle of incidence $\theta_1$ is relatively large, the angle $\theta_p$ is easily set to a small value (for example about 40° or less), and the optical element 15 can be made thin.

(Evaluation 2)

In evaluation 2, the maximum light guide distance when the refractive index of the optical element 15 was changed within a range of 1.2 to 2.0 and the angle $\theta_p$ was changed within a range of 10° to 80°, while the angle of incidence $\theta_1$ of the light 50 from the light source 16 to the optical element 15 was fixed at 0°, was confirmed. The energy ratio to the incident light was calculated at points at distances from a point where the incident light from the light source 16 entered the second glass plate 12 being 0.001 (m), 0.005 (m), 0.01 (m) and subsequently every 0.005 (m). And, the maximum light guide distance (m) at which the energy ratio to the incident light of 0.001 or more was kept. Based on the maximum light guide distance (reference light guide distance) at the angle of incidence $\theta_1$=0°, the refractive index $n_2$ of the optical element 15=1.2 and the angle $\theta_p$=10° being 1, the maximum light guide distances under the respective conditions were represented as the ratios to the reference light guide distance.

Figure 5:
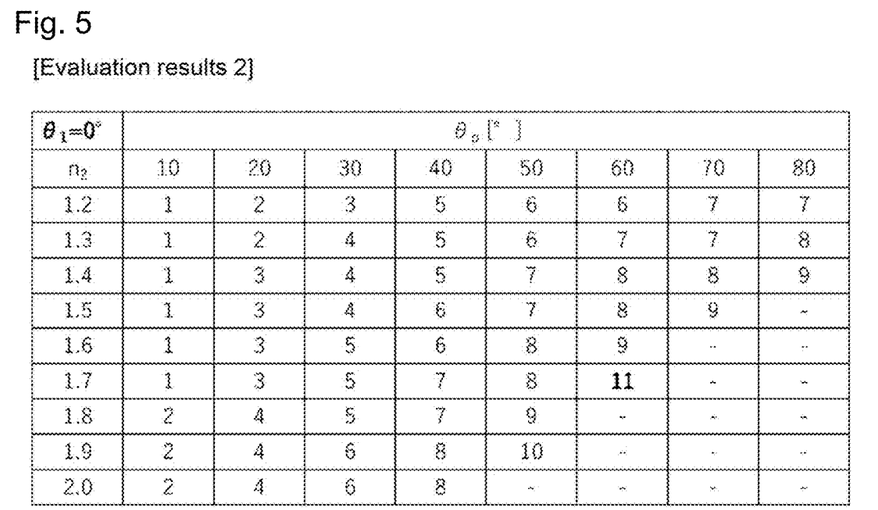
FIG. 5 is a table illustrating simulation results of a vehicular laminated glass according to an embodiment.

In FIG. 5 are shown the simulation results in the evaluation 2. FIG. 5 illustrates the above obtained maximum light guide distance under the respective conditions based on the reference light guide distance (=1). In a case where the light was totally reflected at the interface between the second glass plate 12 and the adhesive interlayer 13 (in a case where the angle $\theta_5$ was 90° or more), the maximum light guide distance was not calculated and represented as "-".

As shown in FIG. 5, when the angle of incidence $\theta_1$ was fixed at 0°, the maximum light guide distance was largest (11 times the reference light guide distance) when the refractive index of the optical element 15 was 1.7 and $\theta_p$ was 60°. As illustrated in FIG. 5, in cases graded "⊚" in the simulation in the evaluation 1, the maximum light guide distances longer than in the cases graded "○" were achieved. No comparison was made with a case where the light was totally reflected at the interface between the second glass plate 12 and the adhesive interlayer 13. In a case where the angle of incidence $\theta_1$ was fixed at 0°, the maximum light guide distance was larger when the refractive index $n_2$ of the optical element 15 was higher, at each angle $\theta_p$. In a case where the angle of incidence $\theta_1$ was fixed at 0°, the maximum light guide distance was larger when the angle $\theta_p$ was larger, at each refractive index $n_2$ of the optical element 15.

The results in FIG. 5 demonstrate that when the angle $\theta_p$ is smaller, use of the optical element 15 having a refractive index higher than the refractive index $n_3$ (1.52) of the glass flat plate is possible. In a case where the angle $\theta_p$ is larger than 80°, for example close to 90°, use of the optical element 15 having a refractive index higher than the refractive index $n_3$ (1.52) of the glass flat plate is substantially difficult.

As evident from the above-described simulation results, according the present embodiment of the invention, the state of the light introduced to the laminated glass 1 can be controlled by adjusting the angle of incidence $\theta_1$ of the irradiation light 50 to the optical element 15, the angle $\theta_p$ formed by the fourth main surface 24 of the second glass plate 12 and the light-receiving surface 19 of the optical element 15, and the refractive index $n_2$ of the optical element 15. Specifically, by adjusting such parameters to predetermined values, the light introduced to the laminated glass 1 can be made to propagate far or close, and the range of propagation of the light introduced to the laminated glass 1 can be controlled.

Figure 6:
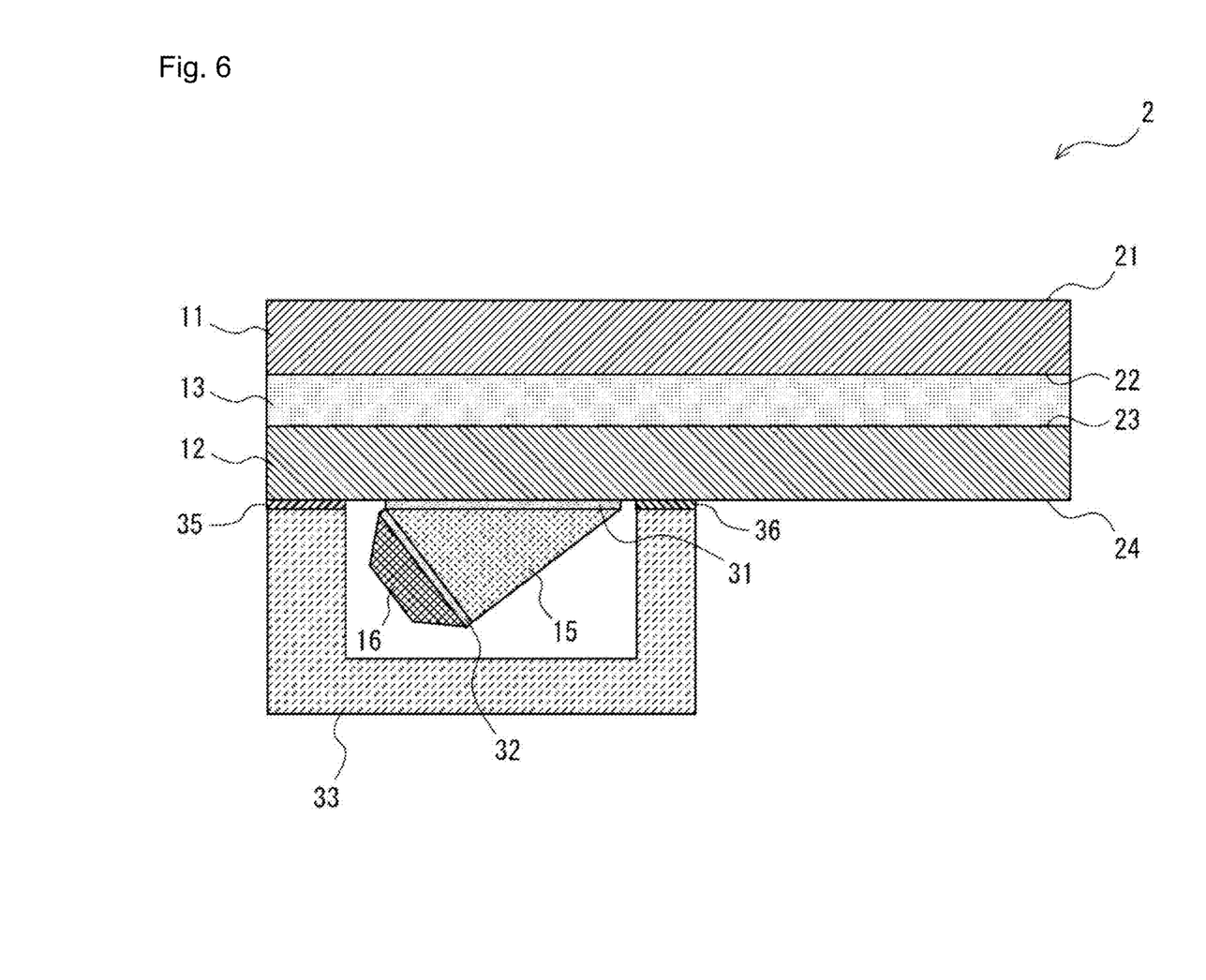
FIG. 6 is a cross-sectional view illustrating another example of the configuration of a vehicular laminated glass according to an embodiment.
Figure 7:
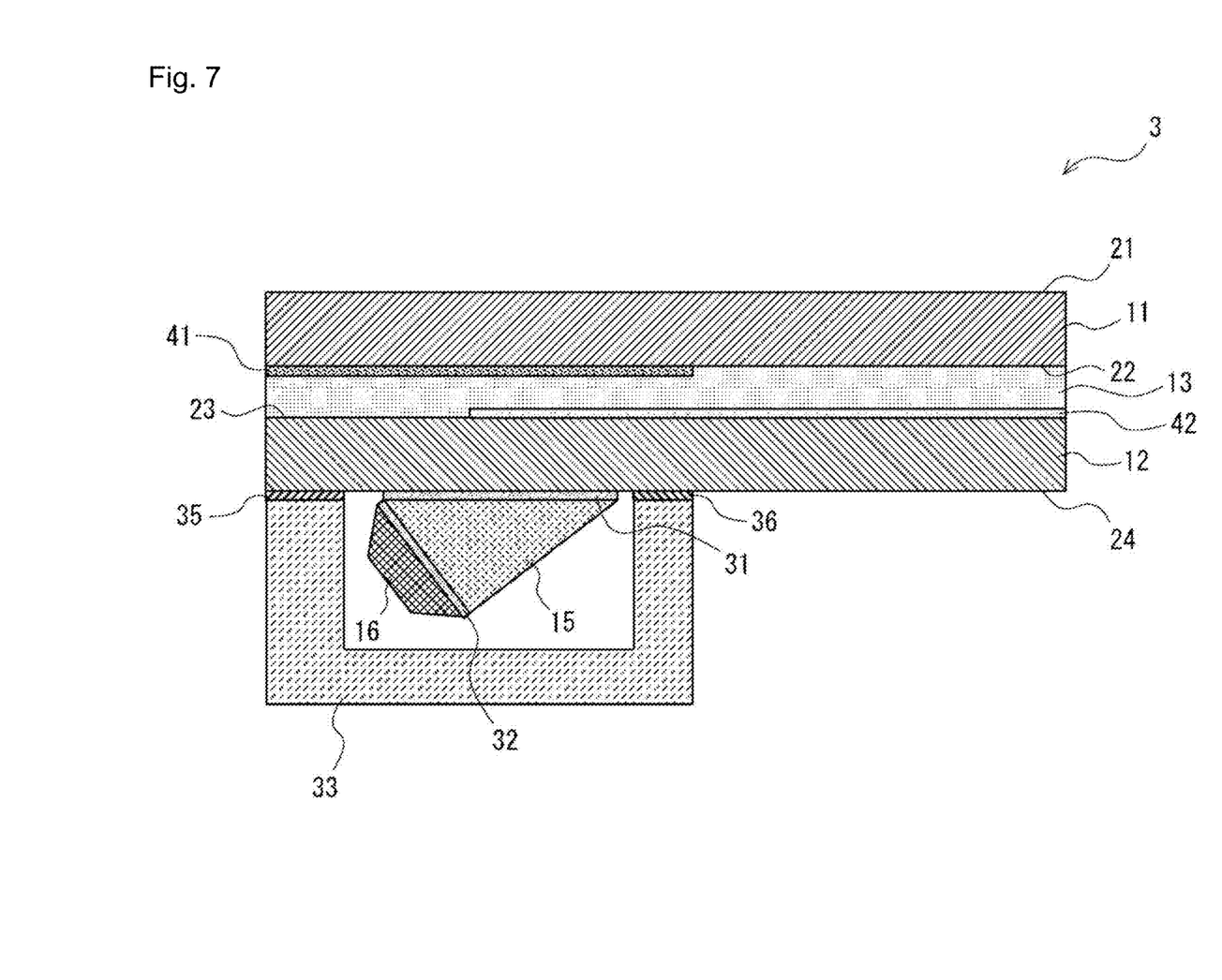
FIG. 7 is a cross-sectional view illustrating another example of the configuration of a vehicular laminated glass according to an embodiment.
Figure 8:
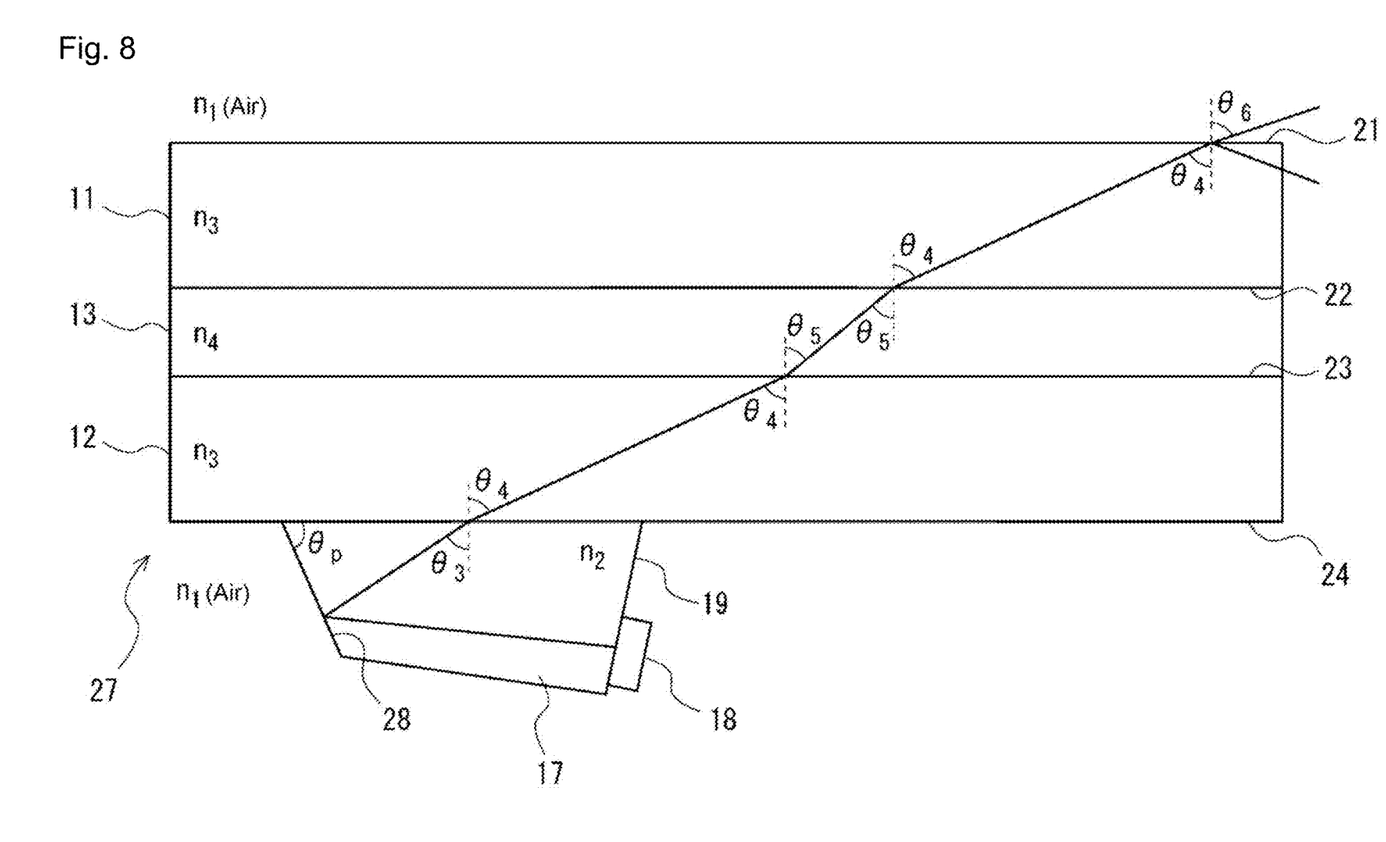
FIG. 8 is a cross-sectional view illustrating another example of the configuration of a vehicular laminated glass according to an embodiment.

Now, another example of the configuration of the laminated glass according to the present embodiment will be described. FIGS. 6 to 8 are cross-sectional view illustrating another examples of the configuration of the laminated glass according to the present embodiment.

In the laminated glass 2 shown in FIG. 6, the optical element 15 is attached to the fourth main surface 24 of the second glass plate 12 via an optical adhesive layer 31. The light source 16 is attached to the light-receiving surface 19 of the optical element 15 (see FIG. 1) via an optical adhesive layer 32. For the optical adhesive layers 31 and 32, for example, an acrylate, silicone, urethane, urethan acrylate, epoxy, epoxy acrylate, acrylamide or methacrylamide type resin composition may be used. The optical adhesive layers 31 and 32 are an adhesive member which transmits at least visible light, and may be either a curable transparent resin or a transparent adhesive sheet. The transparent adhesive sheet may be a sheet-shaped member having the above resin composition provided on a transparent substrate of e.g. a polyester.

In the present embodiment, a covering 33 may be attached to the fourth main surface 24 of the second glass plate 12. The covering 33 is provided to cover the light source 16 and the optical element 15. For example, the covering 33 is attached to the fourth main surface 24 of the second glass plate 12 via adhesive layers 35 and 36. For the adhesive layers 35 and 36, the same resin composition for the optical adhesive layers 31 and 32 may be used, or a different resin composition may be used. The adhesive layers 35 and 36 may be opaque.

The covering 33 may be constituted by a resin, or may be constituted by a metal. The light source 16 may be fixed to the covering 33. Although in the example of the configuration shown in FIG. 6, the covering 33 forms a closed space, the covering 33 may form an open space. That is, the interior of the covering 33 and the exterior may be partially connected. In the present embodiment of the invention, since the state of the light introduced to the laminated glass 2 can be controlled, even when the covering 33 forms an open space, light is less likely to leak outside.

In order that the light from the light source 16 hardly leaks out of the covering 33, a reflective layer may be provided inside the covering 33. In the present embodiment, the covering 33 is not disposed at the edge surface of the laminated glass (it is thin even if disposed), and thus space saving in the width direction of the laminated glass is possible, and the degree of freedom of the design will improve.

In the present embodiment, a scattering layer may be provided at least one of on the first main surface 21 of the first glass plate 11, on the fourth main surface 24 of the second glass plate 12, and between the first main surface 21 of the first glass plate 11 and the fourth main surface 24 of the second glass plate 12. "Between the first main surface 21 of the first glass plate 11 and the fourth main surface 24 of the second glass plate 12" may be any of the second main surface 22 of the first glass plate 11, the third main surface 23 of the second glass plate 12, the interface where the adhesive interlayer 13 and the second main surface 22 of the first glass plate 11 are in contact with each other, the interface where the adhesive interlayer 13 and the third main surface 23 of the second glass plate 12 are in contact with each other, and inside the adhesive interlayer 13.

For example, as in the laminated glass 3 shown in FIG. 7, a scattering layer 42 may be provided at the interface where the adhesive interlayer 13 and the third main surface 23 of the second glass plate 12 are in contact with each other. By providing such a scattering layer 42, the scattered light can be taken out to from vehicle interior side (the first direction side). Here, instead of the adhesive layer 36 attaching the covering 33 to the fourth main surface 24 of the second glass plate 12, or in addition to the adhesive layer 36, a reflective layer (a layer having a reflecting function) may be provided. In a case where such a reflective layer is provided, the light scattered by the scattering layer 42 can be returned to the second glass plate 12 side, and the light can effectively be utilized.

The constituting material of the scattering layer 42 and its forming method are not particularly limited. For the scattering layer 42, a resin sheet of e.g. polyurethane (PU), polyethylene (PE) or silicone may be used. Otherwise, the scattering layer 42 may be formed by conducting surface treatment such as sandblasting or etching on the glass surface. The scattering layer 42 may be formed also by using e.g. ceramic printing or paste.

Further, in the present embodiment, a shielding layer 41 may be provided. In the example of the configuration shown in FIG. 7, the shielding layer 41 is provided at the interface where the adhesive interlayer 13 and the second main surface 22 of the first glass plate 11 are in contact with each other. The shielding layer 41 may be disposed so that the covering 33 and the shielding layer 41 overlap each other in a plan view. In a case where such a shielding layer 41 is provided, the light source 16 and the optical element 15 are hardly visible from the vehicle exterior side.

For example, by making the light to be totally reflected at the interface where the adhesive interlayer 13 and the third main surface 23 of the second glass plate 12 are in contact with each other, the light can proceed between the third main surface 23 of the second glass plate 12 and the fourth main surface 24 of the second glass plate 12. In such a case, since the external medium is the air (refractive index $n_1=1$), the light is totally reflected on the fourth main surface 24 of the second glass plate 12. In a case where the laminated glass is so constituted that the light proceeds inside the second glass plate 12, the scattering layer may be provided at least one of on the fourth main surface 24 of the second glass plate 12, and the interface where the adhesive interlayer 13 and the third main surface 23 of the second glass plate 12 are in contact with each other, to take out the scattered light from the vehicle interior side.

Further, in the present embodiment, as shown in FIG. 8, the light source 18 may be disposed on the opposite side from an edge portion 27 of the laminated glass, on the optical element 17. In other words, the light source 18 may be disposed so that the direction of light irradiation from the light source 18 to the optical element 17, and the light travelling direction in the laminated glass are substantially opposite to each other. In a case where the light source 18 is disposed on the opposite side from the edge portion 27 of the laminated glass, the optical element 17 can be disposed near the edge portion 27 of the laminated glass, and a range where the scattered light can be taken out from the vehicle interior side can be increased.

In a case where the light source 18 is disposed on the opposite side from the edge portion 27 of the laminated glass, the laminated glass may be so constituted that the light is reflected on a reflecting surface 28 of the optical element 17. In such a case, the irradiation light from the light source 18 is reflected on the reflecting surface 28 and enters into the fourth main surface 24 of the second glass plate 12. The other points are the same as described for FIG. 2.

The present invention has been explained with reference to the embodiments. However, it should be understood that the present invention is not limited to the configuration of the above embodiments, and various changes, modifications and combination are possible which can be achieved by a person skilled in the art, within a range of the scope of the invention.

REFERENCE SYMBOLS 1, 2, 3: vehicular laminated glass (laminated glass)
11: first glass plate
12: second glass plate
13: adhesive interlayer
15: optical element
16, 18: light source
19: light-receiving surface
21: first main surface
22: second main surface
23: third main surface
24: fourth main surface
27: edge portion
28: reflecting surface
31, 32: optical adhesive layer
33: covering
35, 36: adhesive layer
50: irradiation light (light)

What is claimed is:

1. A vehicular laminated glass comprising:
a first glass plate having a first main surface and a second main surface;
a second glass plate having a third main surface and a fourth main surface;
an adhesive interlayer disposed between the second main surface and the third main surface;
a light source which faces the fourth main surface and applies light toward the fourth main surface; and
an optical element which disposed between the fourth main surface and the light source and refracts irradiation light from the light source,
wherein the optical element has a light-receiving surface facing the light source,
wherein the refractive index $n_2$ of the optical element is higher than the refractive index $n_3$ of the second glass plate, and
wherein the refractive index $n_2$ of the optical element, the refractive index $n_3$ of the second glass plate, and the angle $\theta_p$, formed by the fourth main surface and the light-receiving surface, satisfy the following formula:

$\sin \theta_p < (n_3/n_2)$.

2. The vehicular laminated glass according to claim 1, wherein the optical element is attached to the fourth main surface.

3. The vehicular laminated glass according to claim 1, wherein the light source is attached to the light-receiving surface of the optical element.

4. The vehicular laminated glass according to claim 1, wherein the refractive index of the optical element is equal to or less than the refractive index of the second glass plate, and
a value obtained by subtracting the refractive index of the optical element from the refractive index of the second glass plate is 0.32 or less.

5. The vehicular laminated glass according to claim 1, wherein the optical element contains glass or a resin material.

6. The vehicular laminated glass according to claim 1, wherein the optical element has a reflective layer.

7. The vehicular laminated glass according to claim 1, further comprising a covering configured to be attached to the fourth main surface, to cover the light source and the optical element.

8. The vehicular laminated glass according to claim 1, further comprising a scattering layer at least one of:
on the first main surface,
on the fourth main surface, or
between the first main surface and the fourth main surface.

9. The vehicular laminated glass according to claim 1, wherein the $\theta_p$ formed by the fourth main surface and the light-receiving surface is within a range of 10° to 80°.

10. The vehicular laminated glass according to claim 1, wherein the angle of incidence $\theta_3$ from the optical element to the second glass plate is within a range of 10° to 80°.

11. The vehicular laminated glass according to claim 1, wherein the optical element has a triangular cross-sectional shape.

12. The vehicular laminated glass according to claim 1, wherein the optical element has an adhesive surface, and the adhesive surface and the fourth main surface are in contact with each other directly or via an optical adhesive layer.

13. The vehicular laminated glass according to claim 12, wherein the optical element includes a portion where the thickness increases and a portion where the thickness decreases, from one end to the other end of a side constituting the adhesive surface, in a cross-sectional view.

14. The vehicular laminated glass according to claim 1, wherein the angle of incidence $\theta_1$ of the irradiation light to the light-receiving surface is 0° or more and 45° or less.

15. The vehicular laminated glass according to claim 14, wherein the angle of incidence $\theta_1$ of the irradiation light to the light-receiving surface is 0° or more and 20° or less.

16. The vehicular laminated glass according to claim 1, wherein the angle of incidence $\theta_4$ of the irradiation light, which has entered the second glass plate by way of the optical element to the third main surface, is within a range of 20° to 90°.

17. The vehicular laminated glass according to claim 16, wherein the angle of incidence $\theta_4$ of the irradiation light, which has entered the second glass plate by way of the optical element to the third main surface, is within a range of 40° to 80°.

18. The vehicular laminated glass according to claim 17, wherein the angle of incidence $\theta_1$ of the irradiation light to the light-receiving surface is 0° or more and 20° or less.

\* \* \* \* \*